United States Patent [19]

Hsu et al.

[11] Patent Number: 5,500,306
[45] Date of Patent: Mar. 19, 1996

[54] HIGH EFFICIENCY ENERGY CONVERSION AND TREATMENT OF ORGANIC WASTE

[75] Inventors: Michael S. Hsu, Lincoln; Irvine W. Wei, Lexington, both of Mass.

[73] Assignee: Ztek Corporation, Waltham, Mass.

[21] Appl. No.: 132,704

[22] Filed: Oct. 6, 1993

Related U.S. Application Data

[63] Continuation-in-part of Ser. No. 686,687, Apr. 17, 1991, abandoned.

[51] Int. Cl.$^6$ ................................................. H01M 8/06
[52] U.S. Cl. .......................... 429/17; 429/19; 48/127.5
[58] Field of Search ................................ 429/12, 13, 17, 429/19, 20; 48/127.3, 127.5, 197 A; 422/184; 123/3; 210/630

[56] References Cited

U.S. PATENT DOCUMENTS

| | | | |
|---|---|---|---|
| 3,466,138 | 9/1969 | Spiegler et al. | 429/12 X |
| 3,841,851 | 10/1974 | Kaiser | 48/111 |
| 4,248,941 | 2/1981 | Louis et al. | 429/13 |
| 4,302,546 | 11/1981 | Schlichting, Jr. | 435/315 |
| 4,565,552 | 1/1986 | Cotton | 48/197 A |
| 4,614,628 | 9/1986 | Hsu et al. | 264/61 |
| 4,638,629 | 1/1987 | Archer et al. | 60/39.05 |
| 4,714,661 | 12/1987 | Kaun et al. | 429/14 |
| 4,750,454 | 6/1988 | Santina et al. | 123/3 |
| 5,094,928 | 3/1992 | Dyer | 429/33 |

FOREIGN PATENT DOCUMENTS

| | | |
|---|---|---|
| 0282473A1 | 9/1988 | European Pat. Off. |
| 3840517A1 | 6/1990 | Germany |

*Primary Examiner*—Anthony Skapars
*Attorney, Agent, or Firm*—Thomas J. Engellenner; Anthony A. Laurentano; Lahive & Cockfield

[57] ABSTRACT

A system and method for converting organic material to electricity includes the steps of collecting a quantity of organic material, generating biogas from the material, and passing the biogas through an energy converter. Biogas is generated from the organic material by an anaerobic filter, and electricity is converted from the biogas by an energy converter, such as a high efficiency solid oxide fuel cell. To further increase the efficiency of the system, an anaerobic digester is used for treating a solid or sludge component of the organic material to generate additional biogas. In one embodiment of the invention, solar energy is used to maintain the anaerobic digester at an elevated temperature. Further efficiency enhancing measures include the recirculation of both the sludge and liquid components of the organic material to obtain additional biogas. After all of the biogas generating potential of the organic material has been utilized, the liquid component thereof is suitable for irrigation or discharge, while the solid component thereof is suitable for use as soil conditioner.

34 Claims, 3 Drawing Sheets

HIGH EFFICIENCY ENERGY CONVERSION AND TREATMENT OF ORGANIC WASTE

REFERENCE TO RELATED APPLICATION

This application is a continuation-in-part of application Ser. No. 686,687 filed Apr. 17, 1991, now abandoned.

BACKGROUND OF THE INVENTION

The present invention generally relates to the field of electrochemical fuel cells and, in particular, to the utilization of organic materials, such as animal waste products, for the generation of electricity.

The annual accumulation of organic waste in the world is immense. For example, the annual accumulation of pig generated organic waste in Taiwan alone is estimated to be over 10 million tons. In addition to the need to address the environmental concerns associated with the disposal of such waste, it has been recognized that waste of this nature could be a valuable source of energy.

Much organic waste contains various substances that, when treated properly, can be converted to methane ($CH_4$). Methane production by known biological treatment processes, such as anaerobic fermentation (also called anaerobic digestion), involves the conversion of organic matter to methane and carbon dioxide at modest temperatures, ambient pressures, and nearly neutral pH. Anaerobic fermentation is typically carried out in the absence of exogenous electron acceptors such as oxygen, nitrate, and sulfate through a series of microbial interactions. Conventional anaerobic fermentation is often used for waste water treatment.

Methanogens (i.e., methane-producing bacteria) have been studied for their utility in digestion processes for producing methane. Because of the limited number of substrates catabolized by methanogens, however, to degrade complex organic substrates to methane by anaerobic digestion, other organisms are necessary as well. A typical anaerobic digester, therefore, will normally contain a mixture of fermentative bacteria, acetogenic bacteria, and methanogenic bacteria.

Fermentative bacteria convert hydrolyzed polymers (soluble sugars, peptides, and long chain fatty acids) to organic acid and alcohol intermediates. These intermediates are then converted into hydrogen, carbon dioxide, and acetic acid by acetogenic bacteria, followed by conversion of the hydrogen, carbon dioxide, and acetic acid into methane by the methanogenic bacteria. The conversion of the acid and alcohol intermediates into methane is slow, relative to the rates of conversion of hydrogen and carbon dioxide into methane.

Presently, only a small percentage of the methane-generating potential of organic waste is extracted for energy use. Moreover, after the generation of methane by known processes, the remaining organic material typically takes the form of partially-treated compost which can be chemically unstable and biologically unsafe. This compost is currently used as an unsuitable fertilizer.

Additionally, biogas generated by the treatment of organic waste usually contains compounds other than methane, e.g., sulfur. In prior art systems, this sulfur must be removed from the biogas before the gas is introduced to an electrochemical converter, to avoid permanently damaging the converter. Thus, additional structure and components are required to purify the biogas prior to introducing the biogas to the electrochemical converter.

It is, therefore, the object of the present invention to provide systems and methods for converting to electricity organic material, such as animal waste, which is more efficient than known methods. It is another object of the invention to provide systems and methods that generate less pollutants than known methods. It is still another object of the invention to provide systems and methods for introducing unrefined biogas to an electrochemical converter.

SUMMARY OF THE INVENTION

These and other objects are achieved by the present invention which features, in one aspect, systems and methods for converting organic material, such as animal waste, to electricity. The present invention generates unrefined biogas, such as methane, from a collected quantity of organic material, and converts the biogas to electricity. The conversion can be carried out by utilizing either combustion or fuel cell methods.

In one embodiment, the invention features the use of an anaerobic filter for the generation of methane from the organic material. The methane is then passed through a device, such as a high efficiency solid oxide fuel cell, for conversion to electricity. The particular advantages associated with the use of an anaerobic filter and a solid oxide fuel cell are discussed in greater detail below.

To facilitate the generation of methane, one embodiment of the invention provides for separating the collected organic material into liquid and solid components. Unrefined biogas is then generated by passing the liquid component of the organic material through the anaerobic filter. For increased efficiency, the solid component is further treated by an anaerobic digester which, in addition to generating more biogas, separates the solid component into a second liquid component and a compost component. The second liquid component is passed through the anaerobic filter for the generation of still more biogas while the compost component is suitable for use as soil conditioner.

To enhance the performance of the anaerobic digester, the digester can be maintained in a "green house" environment at an elevated temperature ranging from about 20° C. to about 55° C. The green house preferably utilizes solar energy to maintain this elevated temperature. It has been found that increased biogas is realized by maintaining the digester at this temperature.

Still another embodiment of the invention provides for thickening the collected quantity of the organic material, and separating the thickened material into liquid and sludge components prior to the generation of biogas. In this embodiment of the invention, biogas is generated from the liquid component by the anaerobic filter, while biogas is generated from the sludge component by the anaerobic digester. After passing through the anaerobic digester, the sludge component is further treated by a solid-liquid separator. The separated solids are then used for compost while the separated liquids are recycled through the system.

In yet another embodiment of the invention, after anaerobic filtering, the liquid component is recirculated through a trickling filter and final clarifier to obtain an effluent liquid, suitably low in biochemical oxygen demand (BOD) and total suspended solids (TSS), which can be discharged to a disposal waterway or used for irrigation purposes in compliance with pollution control standards. Sludge obtained from the liquid component can be passed through the anaerobic digester for the generation of additional biogas.

The above and other objects can also be achieved by the invention which provides, in one aspect, a method for convening organic material to electricity by collecting a quantity of organic material, generating an unrefined biogas component from the collected organic material, directly applying the unrefined biogas component to a fuel cell, and convening the biogas component to electricity.

The invention will next be described in connection with certain preferred embodiments. However, it should be clear that various changes and modifications can be made by those skilled in the art without departing from the spirit and scope of the invention. For example, various high temperature fuel cells can be employed to achieve adequate sulfur tolerance..

DETAILED DESCRIPTION

Generally, the invention features systems and methods for convening organic material, such as animal waste products, to electricity. In prior an systems, organic material typically is delivered to a collection basin in either a continuous flow or batch process. From the collection basin the material is either pumped or gravity driven to a separator for separating solid and liquid components of the material. The liquid component is then delivered to an anaerobic reactor where it resides for a period of approximately 9 to 13 days. A small amount of unrefined biogas, such as methane, is generated in this reactor and removed from the reactor for incidental use either directly as fuel or for generating electricity by an internal combustion engine/generator system. The difficulties with such a system, however, are discussed above.

Once the organic material's capacity as a source of useful biogas is expended, the material is removed from the anaerobic reactor. In accordance with this known system, the solid component of the organic material typically is subjected to aerobic composting for use as fertilizer. As discussed above, however, due to its chemical instability, this material is unsuitable for use as fertilizer.

Figure 1:
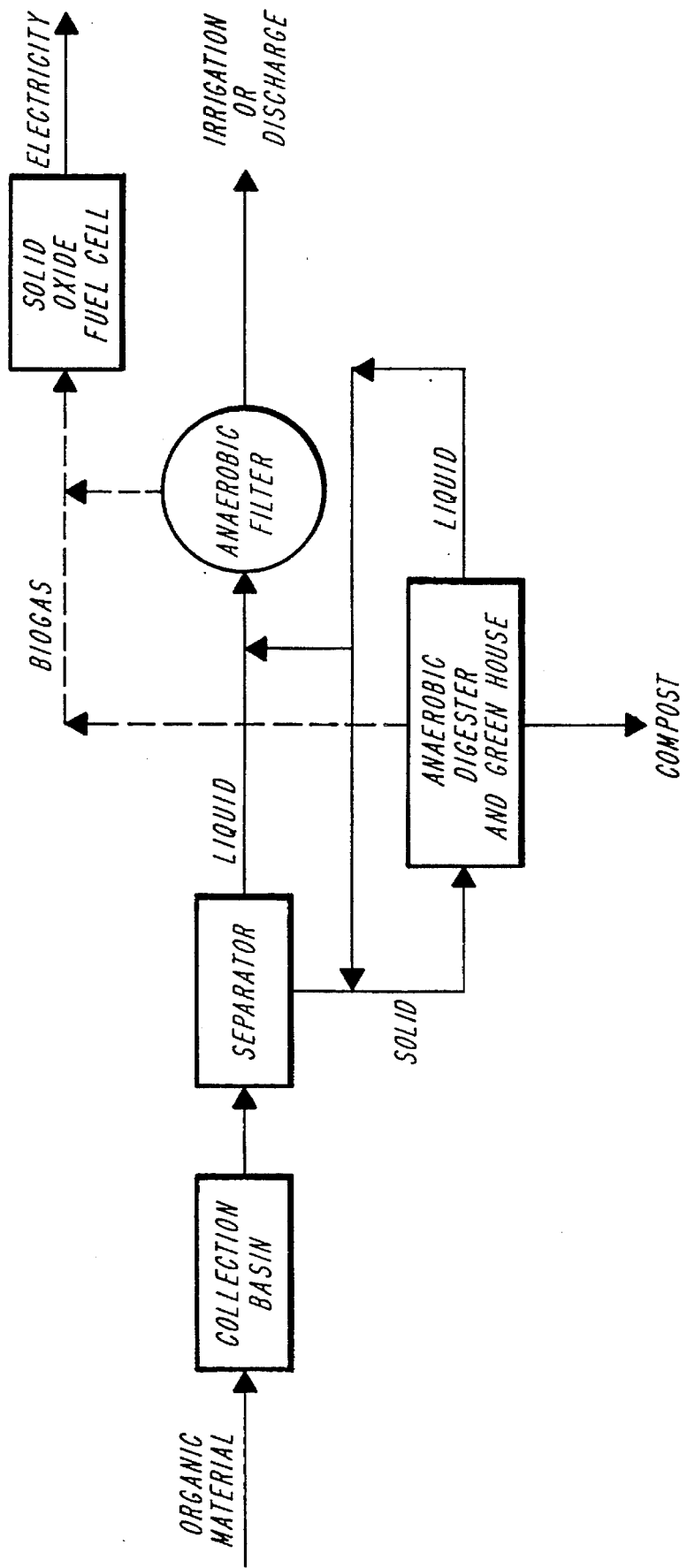
FIG. 1 is a flow diagram depicting a preferred embodiment for converting organic waste material to electricity performed in accordance with the teachings of the present invention.

Significant advantages are enjoyed by the system of the invention as depicted in FIG. 1. In this system, collected organic materials are delivered to a separator which separates liquid and solid components. The liquid component is delivered to an anaerobic filter which employs biological treatment techniques known to those skilled in the art to generate biogas such as methane. The use by the present invention of an anaerobic filter rather than an anaerobic reactor provides large benefits in the form of reduced hydraulic retention time. Hydraulic retention time refers to the period of time the liquid component of the organic material must reside in the anaerobic filter for maximum biogas realization. While in accordance with known systems utilizing anaerobic reactors, the hydraulic retention time can be as much as 13 days, the anaerobic filter exhausts the liquid component's capacity as a source of biogas in approximately two days. This results in significant improvement in the efficiency of the overall system. The significant reduction in hydraulic retention time in the anaerobic filter is achieved by the filter's utilization of a plastic medium on which anaerobic bacteria can grow and maintain a population significantly higher than that associated with known anaerobic reactors.

For even further improvements in efficiency, the FIG. 1 system shows that the solid component of the organic material is not aerobically composted, as is done in known systems, but is delivered to an anaerobic digester. This anaerobic digester allows the system to recover the majority of methane potential inherent in the organic material. It has been found that enhanced efficiency can be achieved by maintaining the digester at an elevated temperature ranging from about 20° C. to about 55° C., and preferably about 35° C. Accordingly, in a preferred embodiment of the invention, the digester is maintained in a greenhouse which utilizes solar energy for maintaining the elevated temperature.

After the solid component's usefulness as a source of methane is exhausted by the anaerobic digester, the solid component is further separated into a compost component and a liquid subcomponent. This liquid subcomponent is added to the liquid component of the organic material being delivered to the anaerobic filter. As a result, every last bit of methane producing ability of the organic material is utilized. Part of this liquid subcomponent can also be recirculated through the anaerobic digester to improve the digester's mixing and, consequently, its biogas-generating efficiency (see FIG. 3).

In accordance with the inventive system, and in addition to utilizing the increased generation of biogas for combustion, either for its direct benefits or as a means for driving an internal combustion engine/generator, the biogas can be converted to electricity via a fuel cell. An advantage of fuel cell conversion is the absence of combustion. This benefit manifests itself in decreased pollutants, easier maintenance, and low noise generation.

In one embodiment of the invention, a high efficiency solid oxide fuel cell is used. A solid oxide fuel cell is an electrochemical converter which employs solid oxide electrolytes. Such converters are capable of high efficiencies, depending only on the relation between the free energy and enthalpy of the electrochemical reaction. An example of a solid oxide fuel cell is described in U.S. Pat. No. 4,614,628 (30 Sep. 1986 to Hsu et al.), the teachings of which are incorporated herein by reference.

Figure 2A:
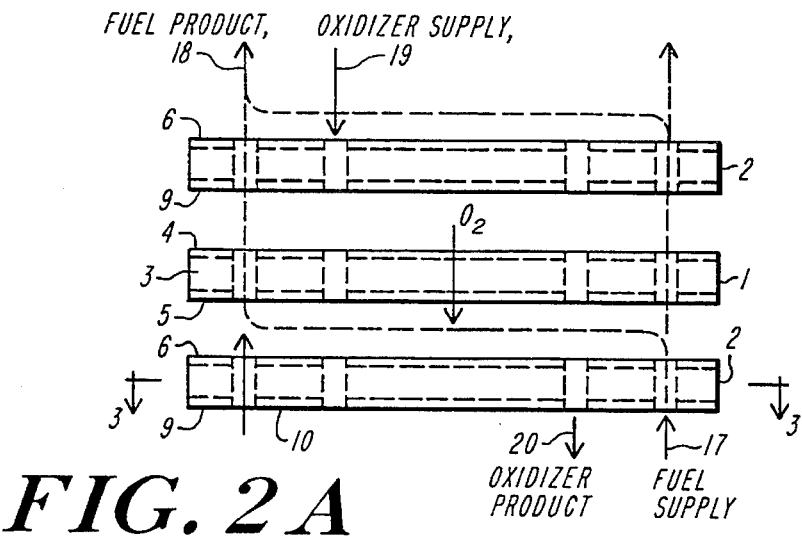
FIGS. 2A, 2B, and 2C are various views of a high efficiency solid oxide fuel cell suitable for use in conjunction with the method of the present invention.
Figure 2B:
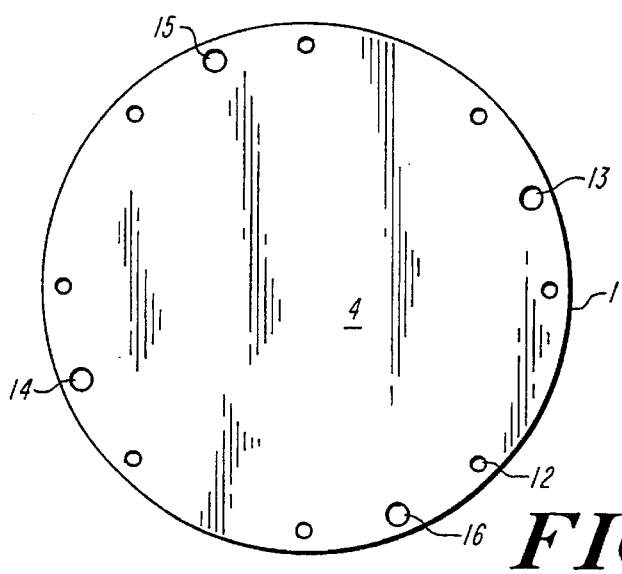
Figure 2C:
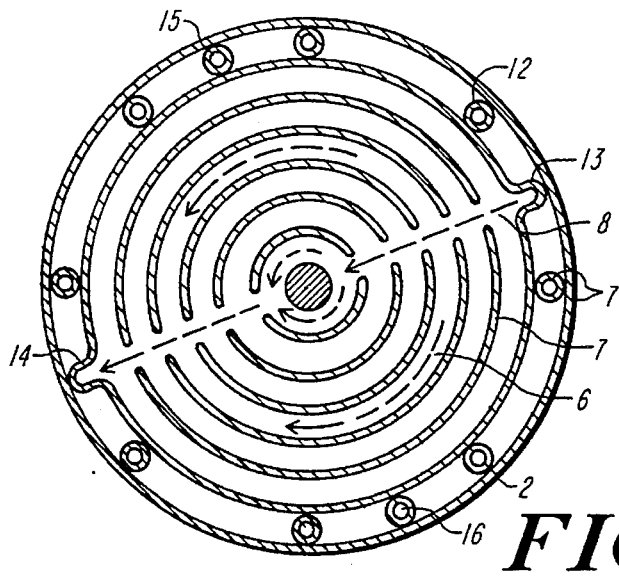

The basic fuel cell is shown in FIGS. 2A, 2B, and 2C and comprises a single electrolyte plate 1, and a single conductor plate 2. The electrolyte plate 1 is made of stabilized zirconia $ZrO_2 \cdot (Y_2O_3)$, component 3, on which porous oxidizer electrode 4 and porous fuel electrode 5 are coated. Preferred materials for oxidizer electrodes are perovskites such as $LaMnO_2(Sr)$. Preferred materials for fuel electrodes are cermets such as $ZrO_2/Ni$. The conductor plate 2 is made of metal such as Inconel or cermets such as $ZrO_2/Ni$. The conductor plates serve as: electric connections between adjacent electrolyte plates 1; gas partitions to achieve a unipolar stack; and heat conduction paths between electrode surfaces 4, 5 and the edges of plates 1, 2.

In a preferred embodiment, unrefined biogas, typically rich in methane and other compounds, such as sulfur, can be directly fed to the stacked cell unit through axial (with respect to the stack) manifold 17 provided by holes 13, and the reaction products (primarily water and $CO_2$) is exhausted through manifold 18 provided by holes 14. The biogas is distributed over the fuel electrode surface 5 through an in-plane groove network 6 formed in the upper surface of the conductor plate 2. Notches 8 made in the ridges 7 provide openings connecting manifolds 17, 18 through holes 13, 14 to fuel the electrode 5. Oxidizer is fed to the stacked cell unit through manifold 19 provided by holes 15 and its product is exhausted through manifold 20 provided by holes 16. Oxidizer is distributed over the oxidizer electrode surface 4 through an in-plane groove network 9 formed in the lower surface of the conductor plate 2 of the adjacent cell unit. Notches similar to notches 8 and ridges similar to ridge 7 provide openings connecting manifolds 17, 18 through holes 13, 14 to oxidizer electrode 4. The ridges 7 and 10 forming side walls of the groove network 6 and 9 on the conductor plates 2 are brought in contact with electrolyte plates 1 in stack assembly. The ridges 7 and 10 are pressed against the porous electrode 5 and the electrode 4 of the adjacent cell unit, respectively, in assembly to achieve electrical contacts. The ridges at the outer edge of the conductor plates 2, the ridges along the edge of bolt holes 12, the ridges along the edge of the upper surface of the conductor plates 2 around the holes 15, 16 and the ridges of the lower surface of the conductor plates 2 around the holes 13, 14 are brought in contact with surface coating which has identical structure as the electrode coatings. These circumferential ridges which are not notched are pressed against the porous coating 4, 5 in assembly to achieve gas seals. Water-cooled tension rods (not shown) which are concealed in bolt holes 12 are used to provide the assembly force.

Various other techniques can be employed to construct fuel cells useful in the present invention. Alternative designs for solid oxide electrochemical fuel cells are disclosed, for example, in U.S. Pat. No. 4,721,556 issued to Hsu on Jan. 26, 1988 and in U.S. Pat. No. 4,853,100 issued to Hsu on Aug. 1, 1989, both incorporated herein by reference. In addition, other types of lower temperature fuel cells, such as molten carbonate fuel cells, phosphoric acid fuel cells, and solid polymer fuel cells may be useful in particular applications. For example, a portion of the contaminants present in the biogas can be removed, FIG. 3, permitting the use of a low temperature fuel cell with a lower degree of tolerance.

Low temperature fuel cells are not ideally suited for directly utilizing unrefined biogas, since directly introducing unrefined biogas into the fuel cell degrades the integrity of the cell. The fuel cell integrity is compromised since the sulfur contaminants typically present in the unrefined biogas poison the fuel cell, permanently damaging the fuel cell, and thus degrading the overall performance of the fuel cell. For example, sulfur compounds present in carbonaceous fuels poison and permanently degrade the catalysts and electrodes which exist in the low temperature fuel cells. Thus, in order for the fuel cell to utilize the biogas as fuel, separate expensive sulfur removing or purification means must be implemented before introducing the biogas, e.g., methane, into the fuel cell.

In a preferred embodiment of the invention, unrefined biogas can be directly introduced into the high temperature fuel cell without permanently degrading the integrity of the fuel cell. High temperature fuel cells, such as solid oxide fuel cells having an operating temperature around 1000° C., generally are more sulfur tolerant than traditional low temperature fuel cells, and can recover from temporary reductions in performance caused by the presence of sulfur contaminants more readily than low temperature fuel cells.

Figure 3:
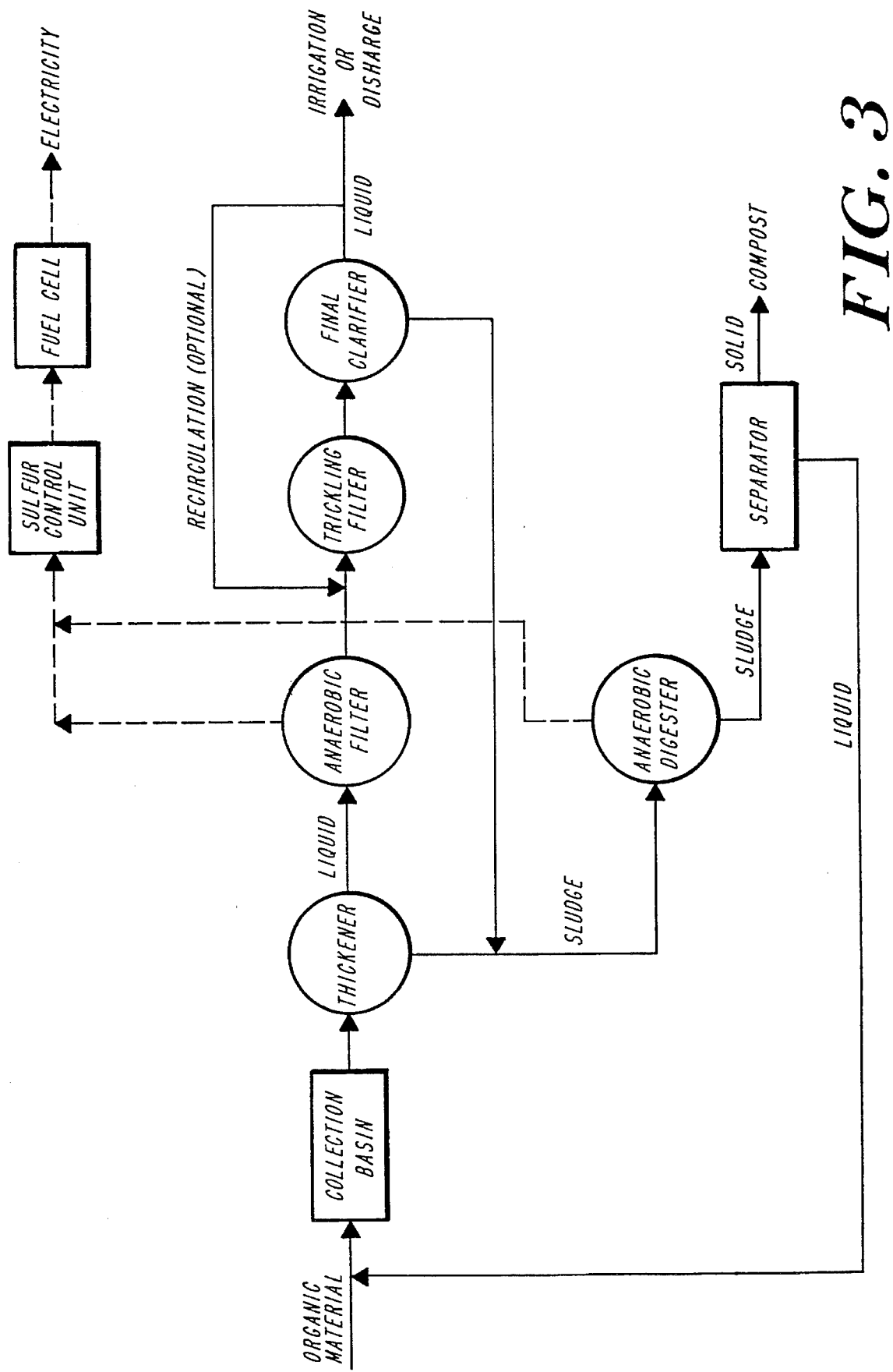
FIG. 3 is a flow diagram depicting another preferred embodiment for converting organic waste material to electricity performed in accordance with the teachings of the present invention.

FIG. 3 is a flow chart depicting another embodiment of the inventive system for converting organic waste materials to electricity. In this embodiment of the invention, the organic materials are thickened by separating a liquid component of the materials from a sludge component. The liquid component is passed through an anaerobic filter for generating biogas such as methane. As discussed above, the hydraulic retention time of the liquid component in the anaerobic filter is approximately 2 days. The sludge component of the organic material is delivered to an anaerobic digester which also generates a biogas component of the organic material. Both biogas components are directly introduced to a fuel cell, such as a solid oxide fuel cell as described above, for the purpose of converting the biogas to electricity, without purifying the biogas beforehand.

In accordance with this embodiment of the invention, treated sludge is removed from the anaerobic digester and separated into its liquid and compost components. The compost component is suitable for use as fertilizer. The liquid component is recycled to the organic material collection basin for retreatment.

For increased efficiency, after the liquid component of the organic material passes through the anaerobic filter, it is delivered to a trickling filter and final clarifier for the purpose of further reducing the pollutant content of the liquid. Trickling filters and final clarifiers as are readily known in the art are suitable for this purpose. Sludge collected in the final clarifier is suitable for being recirculated through the anaerobic digester for the further generation of biogas. Liquid separated in this process is either discharged from the system and used, for example, for irrigation, or recirculated through the trickling filter and final clarifier for further purification and optimal process control.

If desired, the biogas can be treated to remove sulfur, or to otherwise control the sulfur content of the biogas. The sulfur control can be a catalytic converter, gas-scrubber, chemical neutralizer and/or absorber, as known in the art. In some applications, it may be desirable to control the sulfur contents such that the sulfur content is below 10,000 ppm. In other applications, more stringent control mechanisms can be employed, for example, to reduce the sulfur control to less than 10.0 ppm or even lower, to less than 1.0 ppm.

The preceding description of the various embodiments of the invention is intended in all scopes as illustrative rather than limiting. It should be understood that various alterations which are within the spirit and scope of the invention will be apparent to those skilled in the art. The invention is to be defined, therefore, not by the preceding description but by the claims that follow.

What is claimed is:

1. A method for high efficiency conversion of organic material to electricity, the method comprising the steps of
   collecting a quantity of organic material,
   generating an redefined biogas component containing sulfur from said collected quantity of organic material, and
   introducing the sulfur-containing unrefined biogas component into a high-temperature sulfur-tolerant fuel cell, the fuel cell converting the biogas component to electricity by an electrochemical process without significantly degrading the performance of the fuel cell.

2. A method as set forth in claim 1 wherein said generating step is performed by a biological treatment process.

3. A method as set forth in claim 2 wherein said biological treatment process involves an anaerobic filter.

4. A method as set forth in claim 1 further comprising, before said introducing step, the step of controlling the presence of sulfur in said biogas component by removing at least a portion of said sulfur from said biogas, such that said sulfur content in said biogas is below 10,000 ppm.

5. A method as set forth in claim 1 wherein the step of converting said biogas component to electricity is performed by a solid-oxide fuel cell.

6. A method as set forth in claim 1 further comprising the step of, prior to said generating step, separating a first liquid of said quantity of organic material from a solid component of said quantity of organic material, wherein a first biogas component is generated from said first liquid component.

7. A method as set forth in claim 6 further comprising the steps of generating a second biogas component from said solid component, further separating solid component into a second liquid component and a compost component, and mixing said second liquid component with said first liquid component prior to generating said first biogas component.

8. A method as set forth in claim 7 wherein said step of generating said second biogas component is performed by an anaerobic digester.

9. A method as set forth in claim 7 wherein said further separating step is performed by an anaerobic digester.

10. A method as set forth in claim 8 wherein said anaerobic digester is maintained at a temperature ranging from about 20 to about 55 degrees centigrade.

11. A method as set forth in claim 10 wherein said temperature is maintained by solar energy.

12. A method for high efficiency conversion of organic material to electricity, the method comprising the steps of collecting a quantity of organic material, generating an unrefined biogas component containing sulfur from said collected quantity of organic material, applying said unrefined biogas component to a high-temperature sulfur-tolerant fuel cell, the fuel cell being operable on said sulfur-containing biogas component without significantly degrading the performance of said fuel cell, and converting the biogas component to electricity.

13. A method as set forth in claim 12 wherein said generating step is performed by a biological treatment process.

14. A method as set forth in claim 13 wherein said biological treatment process involves an anaerobic filter.

15. A method as set forth in claim 12 wherein said electrochemical converter is a solid-oxide fuel cell.

16. A method as set forth in claim 12 further comprising the step of, prior to said generating step, separating a first liquid component of said quantity of organic material from a solid component of said quantity of organic material, wherein a first biogas component is generated from said first liquid component.

17. A method as set forth in claim 16 further comprising the steps of generating a second biogas component from said solid component, further separating said solid component into a second liquid component and a compost component, and mixing said second liquid component with said first liquid component prior to generating said first biogas component.

18. A method as set forth in claim 17 wherein said step of generating said second biogas component and said further separating step is performed by an anaerobic digester.

19. A method as set forth in one of claim 18 wherein said anaerobic digester is maintained at a temperature ranging from about 20 to about 55 degrees centigrade.

20. A method as set forth in claim 19 wherein said temperature is maintained by solar energy.

21. A method for high efficiency conversion of organic material to electricity, the method comprising the steps of separating a quantity of said organic material into a solid component and a liquid component, introducing said liquid component into an anaerobic filter to generate a first unrefined biogas component, anaerobically digesting said solid component of said organic material to produce a second unrefined biogas component, at least one of said first and second unrefined biogas components containing sulfur, introducing said first and second sulfur-containing unrefined biogas components into a high-temperature sulfur-tolerant fuel cell capable of converting said unrefined biogas component without significantly degrading the performance of the fuel cell, and converting said biogas components to electricity.

22. A method according to claim 21 further comprising the steps of separating said solid component into a compost component and a second liquid component, and introducing said second liquid component into said anaerobic filter to produce an additional unrefined biogas component for conversion into electricity by said fuel cell.

23. A method according to claim 21 wherein said anaerobic digestion occurs at a temperature ranging from about 20° C. to about 55° C.

24. A method according to claim 21 wherein said temperature range is maintained by solar energy.

25. A method according to claim 21 wherein said fuel cell is a solid-oxide fuel cell.

26. A method for high efficiency conversion of organic material to electricity, the method comprising the steps of thickening an initial quantity of organic material.

separating said organic material into a sludge component and a first liquid component, introducing said liquid component into an anaerobic filter to generate a first unrefined biogas component and a processed liquid component, anaerobically digesting said sludge component of said organic material to produce a second unrefined biogas component, at least one of said first and second unrefined biogas components containing sulfur, introducing said first and second unrefined biogas components into a high-temperature sulfur-tolerant fuel cell, said fuel cell being operable on said sulfur-containing biogas components without significantly degrading the performance of said fuel cell, and convening said biogas components to electricity.

27. A method according to claim 26 further comprising the steps of separating said anaerobically;digested sludge component into a compost component and a second liquid component, and introducing said second liquid component into said initial quantity of organic material.

28. A method according to claim 26 further comprising the steps of introducing said processed liquid component into a trickling filter to produce a filtered liquid component, introducing said filtered liquid component into a final clarifier to produce an effluent liquid and a second sludge component, and anaerobically digesting said second sludge component to produce an additional biogas component for conversion into electricity by said fuel cell.

29. A method according to claim 28 further comprising the step of recirculating said effluent liquid by introducing said effluent liquid to said trickling filter for further purification.

30. A method according to claim 29 wherein said effluent liquid is suitably low in biochemical oxygen demands and total suspended solids.

31. A method according to claim 26 wherein said anaerobic digestion occurs at a temperature ranging from about 20° C. to about 55° C.

32. A method according to claim 31 wherein said temperature range is maintained by solar energy.

33. A method according to claim 26 wherein said fuel cell is selected from a group consisting of solid oxide fuel cells, molten carbonate fuel cells, phosphoric acid fuel cells, and solid polymer fuel cells.

34. A method for high efficiency conversion of organic material to electricity, the method comprising the steps of collecting a quantity of organic material, generating an unrefined biogas component containing sulfur from said collected quantity of organic material, and introducing the sulfur-containing unrefined biogas component into a high-temperature solid-oxide fuel cell, operable upon the sulfur-containing biogas component without permanently degrading the performance of the fuel cell to convert the biogas component to electricity by an electrochemical process.

* * * * *

UNITED STATES PATENT AND TRADEMARK OFFICE
CERTIFICATE OF CORRECTION

PATENT NO. : 5,500,306
DATED : March 19, 1996
INVENTOR(S) : Michael S. Hsu and Irvine W. Wei It is certified that error appears in the above-indentified patent and that said Letters Patent is hereby corrected as shown below:

Column 3 line 11, after the word tolerance, delete "." (second Occurrence)
Column 3 line 31, delete "an" and insert --art--

Column 6 line 30, delete "gas-scrubber" and insert --gas scrubber--
Column 6 line 48, delete "redefined" and insert --unrefined--
Column 8 line 34, after the word material, delete "." and insert --,--
Column 8 line 49, delete "convening" and insert --converting--
Column 8 line 52, after the word anaerobically, delete ";"

Signed and Sealed this

Seventh Day of January, 1997

*Attest:*

BRUCE LEHMAN

*Attesting Officer*     *Commissioner of Patents and Trademarks*